United States Patent
Sun et al.

(10) Patent No.: US 11,968,011 B2
(45) Date of Patent: Apr. 23, 2024

(54) MULTI-CHANNEL MULTI-PHASE DIGITAL BEAMFORMING METHOD AND APPARATUS

(71) Applicant: Jun Tang, Hangzhou (CN)

(72) Inventors: Xuejun Sun, Chengdu (CN); Jun Tang, Hangzhou (CN)

(73) Assignee: Jun Tang, Hangzhou (CN)

( * ) Notice: Subject to any disclaimer, the term of this patent is extended or adjusted under 35 U.S.C. 154(b) by 0 days.

(21) Appl. No.: 18/343,795

(22) Filed: Jun. 29, 2023

(65) Prior Publication Data
US 2024/0007156 A1    Jan. 4, 2024

(30) Foreign Application Priority Data
Jun. 30, 2022  (CN) .......................... 202210772653.6

(51) Int. Cl.
H04B 7/06    (2006.01)
(52) U.S. Cl.
CPC ................. *H04B 7/0617* (2013.01)
(58) Field of Classification Search
CPC .................................................... H04B 7/0617
USPC ........................................................ 375/267
See application file for complete search history.

(56) References Cited

U.S. PATENT DOCUMENTS

| 2014/0207839 A1* | 7/2014 | Han | G06F 7/38 |
| | | | 708/604 |
| 2019/0174328 A1* | 6/2019 | Park | H04L 5/0048 |
| 2019/0379565 A1 | 12/2019 | Ma et al. | |

FOREIGN PATENT DOCUMENTS

CN    110927680 A    3/2020

OTHER PUBLICATIONS

Colman Cheung, et al., Time Delay Digital Beamforming for Wideband Pulsed Radar Implementation, 2013 IEEE International Symposium on Phased Array Systems and Technology, 2013, pp. 448-455.

* cited by examiner

*Primary Examiner* — Fitwi Y Hailegiorgis
(74) *Attorney, Agent, or Firm* — Bayramoglu Law Offices LLC

(57) ABSTRACT

A multi-channel multi-phase digital beamforming method and apparatus is provided. The multi-channel multi-phase digital beamforming method includes following steps: S1: pre-configuring a delay filtering coefficient storage table; S2: calculating a filter coefficient and a weighting coefficient; and S3: performing weighted synthesis and filtering processing on a multi-phase signal to form a multi-phase digital beam. When a data rate of an input signal changes, the multi-channel multi-phase digital beamforming method can perform weighted synthesis for the signal at different sampling rates by changing a quantity of signal phases without changing a processing architecture. Based on a multi-phase finite impulse response (FIR) filtering technology, a fractional multiple delay processing architecture that can flexibly adapt to a plurality of phase quantities of the input signal is proposed.

1 Claim, 1 Drawing Sheet

MULTI-CHANNEL MULTI-PHASE DIGITAL BEAMFORMING METHOD AND APPARATUS

CROSS REFERENCE TO THE RELATED APPLICATIONS

This application is based upon and claims priority to Chinese Patent Application No. 202210772653.6, filed on Jun. 30, 2022, the entire contents of which are incorporated herein by reference.

TECHNICAL FIELD

The present disclosure relates to the field of digital signal processing in a communications system, and specifically, to a multi-channel multi-phase digital beamforming apparatus.

BACKGROUND

Various sampling rate adaptation requirements are proposed during digital beamforming. When a sampling rate of an array signal exceeds a processing clock frequency, it is difficult to perform flexible and accurate signal sampling, which brings many inconveniences to the digital beamforming.

SUMMARY

In order to overcome the shortcomings in the prior art, the present disclosure provides a multi-channel, multi-phase digital beamforming method and apparatus, such that when a data rate of an input signal changes and exceeds a processing clock frequency, weighted synthesis can be performed for the signal at different sampling rates by changing a quantity of signal phases without changing a processing architecture.

The objective of the present disclosure is achieved by following technical solutions: A multi-channel multi-phase digital beamforming method includes following steps:

S1: pre-configuring a delay filtering coefficient storage table;
S2: calculating a filter coefficient and a weighting coefficient; and
S3: performing weighted synthesis and filtering processing on a multi-phase signal to form a multi-phase digital beam.

The delay filtering coefficient storage table pre-configured in step S1 includes a plurality of delay filter parameters;

each of the plurality of delay filter parameters includes a filter delay and a corresponding delay filtering coefficient; and the filter delay is in units of a quantity of sampling points, and the filter delay ranges from $-0.5*sPath$ sampling points to $0.5*sPath$ sampling points, where the sPath represents a preset maximum quantity of signal phases.

Preferably, a filter order may be determined based on an actual engineering accuracy requirement, for example, may be 31 or 15. A quantity of stored delay filtering coefficients is determined based on an aperture transition condition and a hardware memory size during actual use, for example, may be 256 for a 4-phase signal.

After the delay filtering coefficient storage table is determined in step S2, a quantity of signal phases is first determined, and the weighting coefficient and the delay filter coefficient are configured, which specifically includes:

S201: assuming that a processing clock frequency is $f_{clk}$, when a sampling rate fs of an input signal exceeds the processing clock frequency $f_{clk}$, dividing the signal into a plurality of phases, and determining the quantity of signal phases:

quantity of signal phases=$fs/f_{clk}$ where the sampling rate fs of the signal is an integer multiple of the clock frequency $f_{clk}$;

S202: assuming that an entire array of a phased-array antenna contains a plurality of subarrays, and each of the plurality of subarrays contains a plurality of array elements, calculating a delay based on a subarray arrangement of the phased-array antenna, and selecting the corresponding filter coefficient from the delay filtering coefficient storage table, where step S202 specifically includes:

A1: for any subarray, calculating a delay t1 from a reference point of the subarray to a reference point of the entire array, where a rectangular coordinate system with the reference point of the entire array as an origin is established, and a calculation formula of the delay t1 is as follows:

$$t_1=(\cos\theta\cos\varphi\, d_{0,1}+\sin\theta\cos\varphi\, d_{0,2}+\sin\varphi\, d_{0,3})/c$$

the reference point of the subarray is any point in the subarray, and the reference point of the entire array is at a center of the phased-array antenna;

$d_{0,1}$, $d_{0,2}$, and $d_{0,3}$ represent x, y, and z coordinates of the reference point of the subarray respectively, c represents a speed of light, $\theta$ represents an azimuth of a beam direction, and $\varphi$ represents a pitch angle of the beam direction;

the delay t1 is decomposed into following three items:

$$t1=N/fclk+\tau1+\delta t$$

where $N=floor(t1*fclk)$, and floor represents downward rounding;

$\tau1=floor((t1-N/fclk)/\Delta\tau)$, where $\Delta\tau$ is calculated according to a following formula: $\Delta\tau=sPath/N\_filter$, and $N\_filter$ represents a quantity of stored delay filters; and $\delta t=t1-N/fclk-\tau1$; and the delay filtering coefficient storage table is searched for a delay filtering coefficient corresponding to the filter delay $\tau1$ as a delay filtering coefficient configured for the current subarray; and A2: repeatedly performing step A1 for each subarray to configure a delay filtering coefficient for each subarray; and S203: calculating the weighting coefficient based on the beam direction, an array antenna arrangement, the quantity of signal phases, and a calibration channel phase, where step S203 specifically includes:

B1: first calculating a delay t2 from an $i^{th}$ array element on the entire array to the reference point of the entire array, establishing the rectangular coordinate system with the reference point of the entire array as the origin, and calculating the delay t2 according to a following formula:

$$t_2=(\cos\theta\cos\varphi\, d_{1,1}+\sin\theta\cos\varphi\, d_{1,2}+\sin\varphi\, d_{1,3})/c$$

where $d_{1,1}$, $d_{1,2}$, and $d_{1,3}$ represent x, y, and z coordinates of an array element point respectively, c represents the speed of light, $\theta$ represents an azimuth of the beam direction, and $\varphi$ represents the pitch angle of the beam direction;

calculation is performed according to a following formula:

$$\tau_2=t_2-N/fclk-\tau_1$$

phase calculation is performed according to a following formula:

$$p = 2\pi f \tau_2$$

where f represents a carrier frequency; and a weighting coefficient of the $i^{th}$ array element is calculated according to following formulas:

$$\omega_i = RE_i + j(IM_i)$$

$$RE_i = \cos[-p - \phi_i]$$

$$IM_i = \sin[-p - \phi_i]$$

where $\phi_i$ represents a known channel phase of the $i^{th}$ array element, which is also referred to as a calibration channel phase of the $i^{th}$ array element; and B2: when i=1, 2, . . . K, repeatedly performing step B1 to obtain weighting coefficients $\omega_1, \omega_2, \ldots$, and $\omega_K$ of various array elements, where K represents a quantity of array elements.

Step S3 includes:

S301: dividing a signal of each phase in the multi-phase signal into signals of K channels by using a power divider, which are denoted as $x_1, x_2, \ldots$, and $x_K$, where $x_i$ represents a signal of an $i^{th}$ channel, and multiplying the signals $x_1, x_2, \ldots$, and $x_K$ of the K channels by weighting coefficients $\omega_1, \omega_2, \ldots$, and $\omega_K$ to obtain weighting results $x_1*\omega_1, x_2*\omega_2, \ldots$, and $x_K*\omega_K$ of the signals of the K channels;

S302: taking out a weighting result $x_i*\omega_i$ of the $i^{th}$ channel in the signal of each phase, adding up weighting results that are taken out to obtain a multi-phase digital beam of the $i^{th}$ channel, and then performing delay filtering on the multi-phase digital beam of the $i^{th}$ channel based on a delay filtering coefficient of a subarray in which an array element corresponding to the weighting coefficient $\omega_i$ is located; and S303: when i=1, 2, . . . , K, repeating step S302 to obtain a total of K delay-filtered multi-phase digital beams.

A multi-channel multi-phase digital beamforming apparatus includes:

a filtering coefficient storage table configuration unit configured to pre-configure a delay filtering coefficient storage table;

a coefficient calculation unit configured to calculate a filter coefficient and a weighting coefficient; and a multi-phase digital beamforming unit configured to perform weighted synthesis and filtering processing on a multi-phase signal to form a multi-phase digital beam.

The present disclosure has following beneficial effects: When a data rate of an input signal changes, the present disclosure can perform weighted synthesis for the signal at different sampling rates by changing a quantity of signal phases without changing a processing architecture, and can perform delay filtering flexibly for a plurality of phase quantities of the input signal.

DETAILED DESCRIPTION OF THE EMBODIMENTS

The technical solutions of the present disclosure are described in further detail below with reference to the accompanying drawings, but the protection scope of the present disclosure is not limited thereto.

Figure 1:
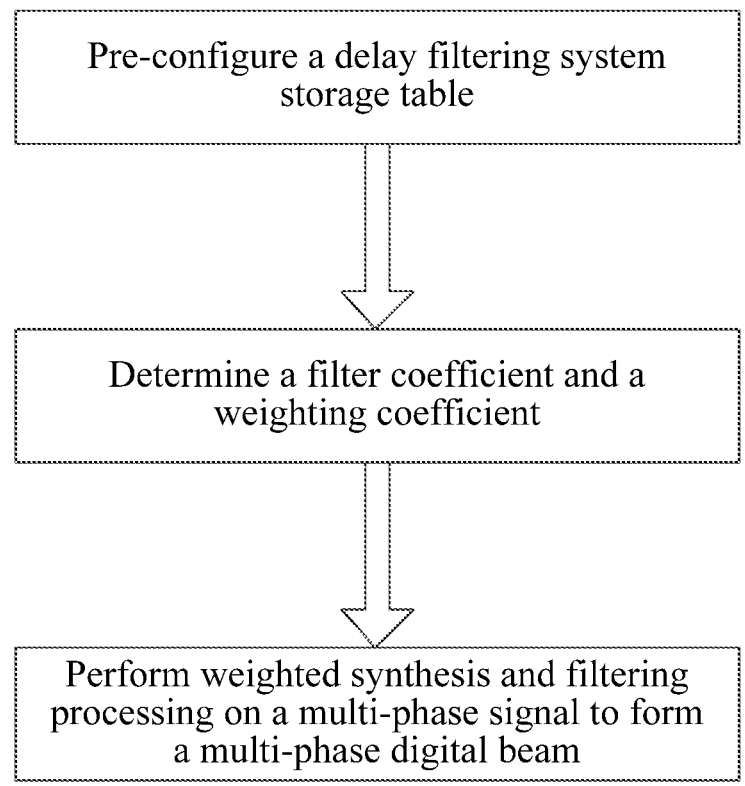
FIG. 1 is a flowchart of a method according to the present disclosure.

As shown in FIG. 1, a multi-channel multi-phase digital beamforming method includes following steps:

S1: A delay filtering coefficient storage table is pre-configured.

When an array signal is synthesized, delay processing of a subarray-level signal is completed by a delay filter, and a filtering coefficient of the delay filter needs to be pre-stored based on an actual engineering application situation. The actual engineering application situation includes a maximum bandwidth of the signal, an array aperture, and the like. Based on the above actual engineering conditions, a maximum delay range (determined by the array aperture), a group delay in-band fluctuation (determined by a maximum in-band phase fluctuation), and a delay quantization interval (determined by an aperture transition condition) during array signal synthesis are calculated to determine the delay filtering coefficient storage table. The filter used in the present disclosure has 32 taps, and a windowing method and a maximum flatness method may be considered for designing a filter coefficient, which need to be selected based on different application scenarios, as shown in a following table.

TABLE 1

Comparison of characteristics and performance of different delay filtering methods

| | Windowing method | Maximum flatness method |
|---|---|---|
| Bandwidth | Flexible range setting | About 0.6 times a sampling rate |
| Group delay fluctuation | Larger than a group delay function of the maximum flatness method A larger bandwidth leads to a larger fluctuation. | An in-band group delay fluctuation is very small, with a fluctuation less than 1 ps under the 0.6 times the sampling rate. |
| Multiplier consumption | 32 × 2 real-number multipliers | 32 × 2 real-number multipliers |
| Supplementary description | Recommending chebwin in the case of a large bandwidth (a main-to-side lobe ratio may be set) | Recommending use in the case of a small bandwidth |

The configured delay filtering coefficient storage table includes a plurality of delay filter parameters.

Each of the plurality of delay filter parameters includes a filter delay and a corresponding delay filtering coefficient.

The filter delay is in units of a quantity of sampling points, and the filter delay ranges from −0.5*sPath sampling points to 0.5*sPath sampling points, where the sPath represents a preset maximum quantity of signal phases.

S2: A weighting coefficient and the filter coefficient are configured.

After the delay filtering coefficient storage table is determined, parameters for array signal synthesis are configured, including a quantity of signal phases, the weighting coefficient, and the delay filter coefficient. Assuming that a processing clock frequency is $f_{clk}$, when a sampling rate of an input signal exceeds the processing clock frequency, the signal is divided into a plurality of phases, and the quantity of signal phases is determined. In addition, the weighting coefficient is calculated based on a beam direction, an array antenna arrangement, the quantity of signal phases, and a calibration channel phase. A delay is calculated based on a subarray arrangement and the quantity of signal phases, and an appropriate filter coefficient is selected from the filtering coefficient storage table.

S3: Weighted synthesis and filtering processing are performed on the multi-phase signal to form a multi-phase digital beam.

A multi-channel multi-phase digital beamforming apparatus includes:

a filtering coefficient storage table configuration unit configured to pre-configure a delay filtering coefficient storage table;

a coefficient calculation unit configured to calculate a filter coefficient and a weighting coefficient; and a multi-phase digital beamforming unit configured to perform weighted synthesis and filtering processing on a multi-phase signal to form a multi-phase digital beam.

Figure 2:
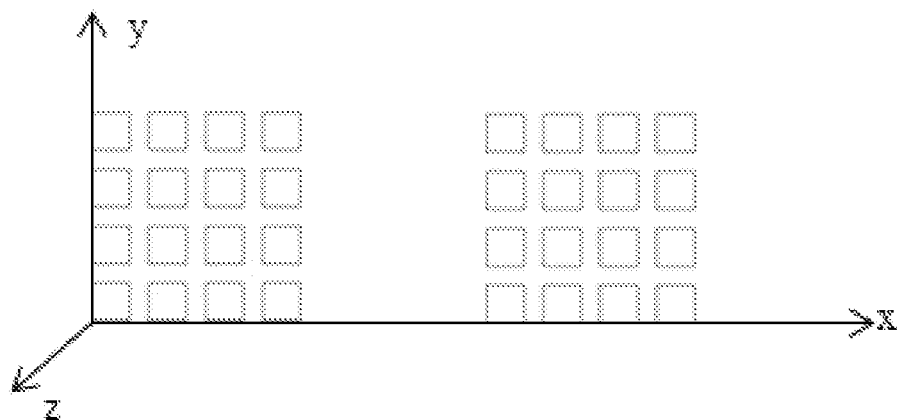
FIG. 2 is a schematic diagram of an array element according to an embodiment.

In the embodiments of the present disclosure, a sampling clock fclk is set to 240 MHz. In a phased-array antenna, a subarray is constituted by 16 array elements. For a two-phase input signal with two subarrays, namely, 32 array elements, a maximum aperture of an array form is 13 meters, and a distance difference between different subarrays in a single beam to a far-field target does not exceed 10 meters. A spacing between array elements is d, which is equal to 6.5 mm, and a spacing between subarrays is D, which is equal to 100 mm. An array element diagram is shown in FIG. 2.

A specific process of configuring the weighting coefficient and the filter coefficient is as follows:

S201: It is assumed that the processing clock frequency is $f_{clk}$. When the sampling rate fs of the input signal exceeds the processing clock frequency $f_{clk}$, the signal is divided into the plurality of phases, and the quantity of signal phases is determined:

$$\text{quantity of signal phases} = fs/f_{clk}$$

In the above formula, the sampling rate fs of the signal is an integer multiple of the clock frequency $f_{clk}$.

S202: It is assumed that an entire array of the phased-array antenna contains a plurality of subarrays, and each of the plurality of subarrays contains a plurality of array elements. A delay is calculated based on the subarray arrangement of the phased-array antenna, and the corresponding filter coefficient is selected from the delay filtering coefficient storage table. Specifically, step S202 includes:

A1: For any subarray, a delay t1 from a reference point of the subarray to a reference point of the entire array is calculated.

A rectangular coordinate system with the reference point of the entire array as an origin is established, and a calculation formula of the delay t1 is as follows:

$$t_1 = (\cos\theta \cos\varphi\, d_{0,1} + \sin\theta \cos\varphi\, d_{0,2} + \sin\varphi\, d_{0,3})/c$$

The reference point of the subarray is any point in the subarray, and the reference point of the entire array is at a center of the phased-array antenna.

$d_{0,1}$, $d_{0,2}$, and $d_{0,3}$ represent x, y, and z coordinates of the reference point of the subarray respectively, c represents a speed of light, θ represents an azimuth of the beam direction, and φ represents a pitch angle of the beam direction.

The delay t1 is decomposed into following three items:

$$t1 = N/fclk + \tau 1 + \delta t$$

In the above formula, N=floor(t1*fclk), and floor represents downward rounding;

τ1=floor((t1−N/fclk)/Δτ), where Δτ is calculated according to a following formula: Δτ=sPath/N_filter, and N_filter represents a quantity of stored delay filters; and $$\delta t = t1 - N/fclk - \tau 1.$$

The delay filtering coefficient storage table is searched for a delay filtering coefficient corresponding to the filter delay τ1 as a delay filtering coefficient configured for the current sub array.

A2: Step A1 is repeatedly performed for each subarray to configure a delay filtering coefficient for each subarray.

S203: The weighting coefficient is calculated based on the beam direction, the array antenna arrangement, the quantity of signal phases, and the calibration channel phase. Specifically, step S203 includes:

B1: A delay t2 from an $i^{th}$ array element on the entire array to the reference point of the entire array is first calculated, the rectangular coordinate system with the reference point of the entire array as the origin is established, and the delay t2 is calculated according to a following formula:

$$t_2 = (\cos\theta \cos\varphi\, d_{1,1} + \sin\theta \cos\varphi\, d_{1,2} + \sin\varphi\, d_{1,3})/c$$

where $d_{1,1}$, $d_{1,2}$, and $d_{1,3}$ represent x, y, and z coordinates of an array element point respectively, c represents the speed of light, θ represents the azimuth of the beam direction, and φ represents the pitch angle of the beam direction.

Calculation is performed according to a following formula:

$$\tau_2 = t_2 - N/fclk - \tau_1$$

Phase calculation is performed according to a following formula:

$$p = 2\pi f \tau_2$$

In the above formula, f represents a carrier frequency.

A weighting coefficient of the $i^{th}$ array element is calculated according to following formulas:

$$\omega_i = RE_i + j(IM_i)$$

$$RE_i = \cos[-p - \phi_i]$$

$$IM_i = \sin[-p - \phi_i]$$

In the above formulas, $\phi_i$ represents a known channel phase of the $i^{th}$ array element, which is also referred to as a calibration channel phase of the $i^{th}$ array element.

B2: When i=1, 2, . . . , K, step B1 is repeatedly performed to obtain weighting coefficients $\omega_1$, $\omega_2$, . . . , and $\omega_K$ of various array element, where K represents a quantity of array elements.

A specific process of performing the weighted synthesis and filtering processing on the multi-phase signal to form the multi-phase digital beam is as follows:

S301: A signal of each phase in the multi-phase signal is divided into signals of K channels by using a power divider, which are denoted as $x_1, x_2, \ldots,$ and $x_K$, where $x_i$ represents a signal of an $i^{th}$ channel, and the signals $x_1, x_2, \ldots,$ and $x_K$ of the K channels are multiplied by weighting coefficients $\omega_1, \omega_2, \ldots,$ and $\omega_K$ to obtain weighting results $x_1{}^*\omega_1, x_2{}^*\omega_2, \ldots,$ and $x_K{}^*\omega_K$ of the signals of the K channels.

S302: Weighting result $x_i{}^*\omega_i$ of the $i^{th}$ channel in the signal of each phase is taken out, weighting results that are taken out are added up to obtain a multi-phase digital beam of the $i^{th}$ channel, and then delay filtering is performed on the multi-phase digital beam of the $i^{th}$ channel based on a delay filtering coefficient of a subarray in which an array element corresponding to the weighting coefficient $\omega_i$ is located.

S303: When i=1, 2, . . . , K, step S302 is repeatedly performed to obtain a total of K delay-filtered multi-phase digital beams.

The above explanation shows and describes one preferred embodiment of the present disclosure. But as mentioned above, it should be understood that the present disclosure is not limited to the form disclosed herein, and the explanation should not be regarded as an exclusion of other embodiments. Various combinations, modifications and environments can be achieved through the above guides, technologies or knowledge in related fields within the scope of conception of the present disclosure described herein. Modifications and changes made by those skilled in the art without departing from the spirit and scope of the present disclosure should fall within the protection scope of the appended claims of the present disclosure.

What is claimed is:

1. A multi-channel multi-phase digital beamforming method, comprising following steps:

S1: pre-configuring a delay filtering coefficient storage table;

wherein the delay filtering coefficient storage table comprises a plurality of delay filter parameters;

each of the plurality of delay filter parameters comprises a filter delay and a corresponding delay filtering coefficient; and the filter delay is in units of a quantity of sampling points, and the filter delay ranges from −0.5*sPath sampling points to 0.5*sPath sampling points, wherein the sPath represents a preset maximum quantity of signal phases;

S2: determining a filter coefficient and a weighting coefficient;

wherein after the delay filtering coefficient storage table is determined in step S2, a quantity of signal phases is first determined, and the weighting coefficient and the delay filter coefficient are configured, which specifically comprises:

S201: assuming that a processing clock frequency is $f_{clk}$, when a sampling rate fs of an input signal exceeds the processing clock frequency $f_{clk}$, dividing the signal into a plurality of phases, and determining the quantity of signal phases:

quantity of signal phases=$fs/f_{clk}$ wherein the sampling rate fs of the signal is an integer multiple of the clock frequency $f_{clk}$;

S202: assuming that an entire array of a phased-array antenna contains a plurality of subarrays, and each of the plurality of subarrays contains a plurality of array elements, calculating a delay based on a subarray arrangement of the phased-array antenna, and selecting a corresponding filter coefficient from the delay filtering coefficient storage table, wherein step S202 specifically comprises:

A1: for any subarray, calculating a delay t1 from a reference point of the subarray to a reference point of the entire array, wherein a rectangular coordinate system with the reference point of the entire array as an origin is established, and a calculation formula of the delay t1 is as follows:

$t_1 = (\cos\theta \cos\varphi\, d_{0,1} + \sin\theta \cos\varphi\, d_{0,2} + \sin\varphi\, d_{0,3})/c$ the reference point of the subarray is any point in the subarray, and the reference point of the entire array is at a center of the phased-array antenna;

$d_{0,1}$, $d_{0,2}$, and $d_{0,3}$ represent x, y, and z coordinates of the reference point of the subarray respectively, c represents a speed of light, θ represents an azimuth of a beam direction, and φ represents a pitch angle of the beam direction;

the delay t1 is decomposed into following three items:

$t1 = N/fclk + \tau1 + \delta t$ wherein N=floor(t1*fclk), and floor represents downward rounding;

$\tau 1 =$floor(t1*fclk)/Δτ, wherein Δτ is calculated according to a following formula: Δτ=sPath/N_filter, and N_filter represents a quantity of stored delay filters; and δt=t1−N/fclk−τ1; and the delay filtering coefficient storage table is searched for a delay filtering coefficient corresponding to the filter delay τ1 as a delay filtering coefficient configured for the current sub array; and A2: repeatedly performing step A1 for each subarray to configure a delay filtering coefficient for each sub array; and S203: calculating the weighting coefficient based on the beam direction, an array antenna arrangement, the quantity of signal phases, and a calibration channel phase, wherein step S203 specifically comprises:

B1: first calculating a delay t2 from an $i^{th}$ array element on the entire array to the reference point of the entire array, establishing the rectangular coordinate system with the reference point of the entire array as the origin, and calculating the delay t2 according to a following formula:

$t_2 = (\cos\theta \cos\varphi\, d_{1,1} + \sin\theta \cos\varphi\, d_{1,2} + \sin\varphi\, d_{1,3})/c$ wherein $d_{1,1}$, $d_{1,2}$, and $d_{1,3}$ represent x, y, and z coordinates of an array element point respectively, c represents the speed of light, θ represents the azimuth of the beam direction, and φ represents the pitch angle of the beam direction;

calculating a filter delay τ2 according to the following formula:

$\tau_2 = t_2 - N/fclk - \tau_1$ calculating a phase p according to the following formula:

$p = 2\pi f \tau_2$ wherein f represents a carrier frequency; and calculating a weighting coefficient of the $i^{th}$ array element according to the following formulas:

$\omega_i = RE_i + j(IM_i)$ $RE_i = \cos[-p - \phi_i]$ $IM_i = \sin[-p - \phi_i]$ wherein $\phi_i$ represents a known channel phase of the $i^{th}$ array element, which is also referred to as a calibration channel phase of the $i^{th}$ array element; and B2: when i=1, 2, . . . , K, repeatedly performing step B1 to obtain weighting coefficients $\omega_1, \omega_2, \ldots,$ and $\omega_K$ of various array elements, wherein K represents a quantity of array elements; and S3: performing weighted synthesis and filtering processing on a multi-phase signal to form a multi-phase digital beam;

wherein step S3 comprises:

S301: dividing a signal of each phase in the multi-phase signal into signals of K channels by using a power divider, which are denoted as $x_1, x_2, \ldots,$ and $x_K$, wherein $x_i$ represents a signal of an $i^{th}$ channel, and multiplying the signals $x_1, x_2, \ldots,$ and $x_K$ of the K channels by weighting coefficients $\omega_1, \omega_2, \ldots,$ and $\omega_K$ to obtain weighting results $x_1*\omega_1, x_2*\omega_2, \ldots,$ and $x_K*\omega_K$ of the signals of the K channels;

S302: taking out a weighting result $x_i * \omega_i$ of the $i^{th}$ channel in the signal of each phase, adding up weighting results that are taken out to obtain a multi-phase digital beam of the $i^{th}$ channel, and then performing delay filtering on the multi-phase digital beam of the $i^{th}$ channel based on a delay filtering coefficient of a subarray in which an array element corresponding to the weighting coefficient $\omega_i$ is located; and S303: when i=1, 2, . . . , K, repeating step S302 to obtain a total of K delay-filtered multi-phase digital beams.

\* \* \* \* \*